No. 745,812.   Patented December 1, 1903.

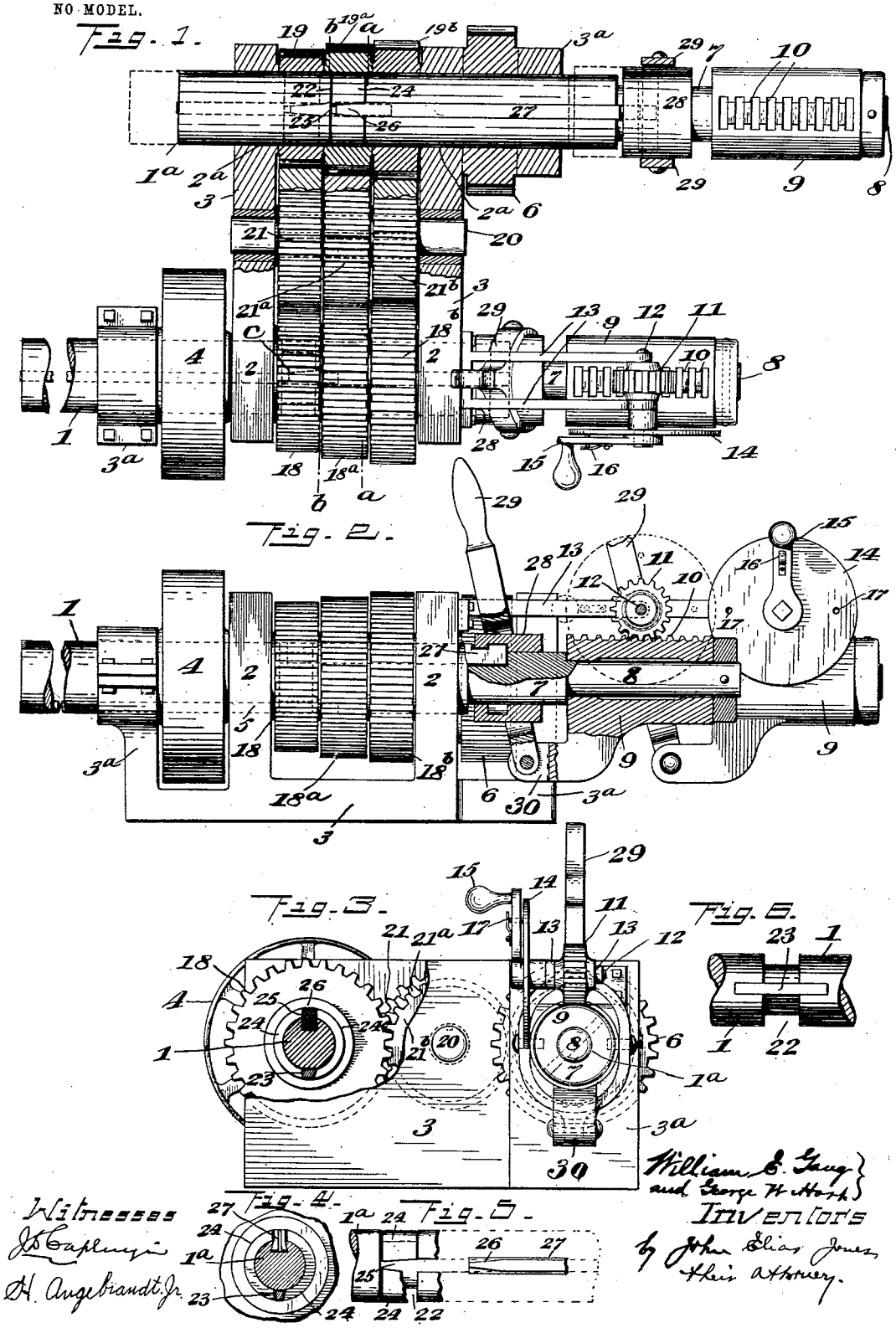

UNITED STATES PATENT OFFICE.

WILLIAM E. GANG, OF CINCINNATI, AND GEORGE W. HART, OF FERNBANK, OHIO, ASSIGNORS TO THE WILLIAM E. GANG COMPANY, OF CINCINNATI, OHIO, A CORPORATION OF OHIO.

DEVICE FOR TRANSMITTING MOTION.

SPECIFICATION forming part of Letters Patent No. 745,812, dated December 1, 1903.

Application filed January 22, 1903. Serial No. 140,114. (No model.)

*To all whom it may concern:*

Be it known that we, WILLIAM E. GANG, a resident of Cincinnati, and GEORGE W. HART, a resident of Fernbank, in the county of Hamilton and State of Ohio, citizens of the United States of America, have invented certain new and useful Improvements in Devices for Transmitting Motion, of which the following is a specification.

This invention relates to certain improvements in devices for transmitting motion, and has for its object to provide a device of this character of a simple and inexpensive nature and of a light, strong, and compact structure which shall be adapted for easy and convenient operation for varying the speed at which the motion is transmitted by the device, the structure being of a character such that a large number of speed variations are made possible without requiring the gearing to be thrown into or out of engagement.

The invention consists in certain novel features of the construction, combination, and arrangement of the several parts of the improved transmitting device whereby certain important advantages are attained and the device is made simpler, cheaper, and otherwise better adapted and more convenient for use, all as will be hereinafter fully set forth.

The novel features of the invention will be carefully defined in the claims.

In the accompanying drawings, which serve to illustrate our invention, Figure 1 is a plan view partially in section and showing a transmitting device embodying our improvements; and Fig. 2 is a side elevation of the same, also partly shown in section to illustrate certain features to be hereinafter referred to. Fig. 3 is an end elevation of the device, one side thereof being also shown in section in the plane indicated by the line *b b* in Fig. 1. Fig. 4 is a fragmentary sectional view taken transversely through one of the transmitting-shafts of the device in the plane indicated by the line *a a* in Fig. 1. Fig. 5 is a fragmentary view showing a portion of one of the transmitting-shafts with the wedge and clutch members carried thereon. Fig. 6 is a detail view showing a fragment of one of the transmitting shafts with the filling carried thereby for centralizing the clutch members.

As shown in the views, the improved transmitting device comprises two transmitting-shafts, 1 and 1$^a$, which are mounted for rotative or turning movement in bearings 2 and 2$^a$, respectively, in a frame 3 of suitable construction, which latter may be integral with the frame of a mechanism of any desired character in connection with which the improved transmitting-device is designed for use. Each of the transmitting-shafts 1 and 1$^a$ is also adapted for longitudinal or endwise movement through its bearings in the frame 3 for purposes to be hereinafter set forth, and one shaft, as 1, is provided with a pulley 4, held by a feather, as indicated in dotted lines at 5 in Fig. 2, so as to turn with the shaft while permitting the endwise movement of the shaft, above referred to, to be effected without movement of the pulley, said pulley 4 being held by an arm 3$^a$ of the frame against such movement when the shaft is moved endwise. The other transmitting-shaft, as 1$^a$, carries a gear-wheel 6, similarly held by a feather (not shown) to turn with the shaft and held by an arm 3$^a$ of the frame 3 against longitudinal movement when the shaft 1$^a$ is moved endwise. With this arrangement of the parts it will be evident that the first-named transmitting-shaft 1 of the device may be employed as a driven shaft and may receive power for its rotation from any suitable source by means of a band passed over the pulley 4, while the other transmitting-shaft, 1$^a$, may be employed as a driving-shaft, being adapted to transmit its movement to any desired mechanism by means of gears meshing with the gear-wheel 6. It will be evident, however, that other means than the pulley 4 and gear-wheel 6 may be employed for communicating the motion to and from the transmitting device, and for this reason we do not desire to be understood as limiting ourselves to the employment of these means precisely.

Each of the shafts 1 and 1ᵃ has at one end of the frame 3 of the device a projecting portion 7, the extremity 8 of which is made in reduced diameter to form a stud whereon is held by any suitable means a collar 9, having its upper portion formed with a rack-face 10, adapted to be engaged by a pinion 11, held on a stud 12, journaled in bearings at the ends of the arms of a yoke 13, secured to the end of the frame 3 and extended above the projecting end of the transmitting-shaft, as shown in Figs. 1 and 2. One end of the stud 12 is extended through the central part of a disk-shaped part or plate 14, held to the yoke 13, and has outside of said plate or part a handle 15, whereby the stud may be turned, the handle being provided with a spring-pressed pin or dog 16, adapted to be engaged in openings 17 in the part or plate 14 and when so engaged serving to hold the handle against turning until the dog is disengaged from an opening 17. There is of course a device of this character for the end portion of each transmitting-shaft, and it will be seen that when the pin or dog 16 of either shaft 1 or 1ᵃ is withdrawn from an opening 17 in plate 14 and the handle 15 is rotated the rotative movement of stud 13 will be transmitted through the engagement of pinion 11 with the rack-face 10 on the end of that shaft, so as to impart longitudinal or endwise movement to said shaft, and when a desired adjustment of the shaft endwise has been effected the dog or pin 16 may be again engaged with the corresponding opening 17 to lock the parts against dislocation.

The bearings 2 2 and 2ᵃ 2ᵃ, in which the shafts 1 and 1ᵃ are held to turn, are spaced apart from each other to receive a series of three gears loosely held upon each shaft between its bearings, the gears upon the shaft 1 being numbered in the drawings 18, 18ᵃ, and 18ᵇ and those upon the shaft 1ᵃ being similarly numbered 19, 19ᵃ, and 19ᵇ. The gear-wheels upon the shaft 1ᵃ have their faces alined with, but not in mesh with, those of the gear-wheels upon the shaft 1, and in the frame 3 is journaled a third or intermediate shaft 20, whereon are held fixedly a series of three gear-wheels 21, 21ᵃ, and 21ᵇ, the faces of which are in mesh with those of the other two series of gear-wheels upon the shafts 1 and 1ᵃ, so that when rotatory movement is imparted to either one of the gear-wheels upon either of the transmitting-shafts 1 or 1ᵃ said movement will be imparted to each of the other gears upon said two shafts 1 and 1ᵃ through the medium of the three gear-wheels upon shaft 20, for since said gear-wheels are fixed on said shaft 20 and compelled to turn in unison it will be evident that the one in mesh with the gear-wheel to which movement is imparted in the first instance will drive each of the other gears on shaft 20 and through them will actuate those gears with which they mesh.

In connection with the mechanism above described and comprising the shafts and gears we provide a clutch mechanism for locking either one of the gears on each transmitting-shaft 1 or 1ᵃ to its shaft, so that when movement is imparted to the gears, as above described, it may be communicated through either of the gears 18, 18ᵃ, or 18ᵇ on shaft 1 or through either of the gears 19, 19ᵃ, or 19ᵇ on shaft 1ᵃ to drive one of said shafts from the other, and since, as herein shown, the gears of the several series are made in different diameters it will be evident that by means of said clutch device a considerable number of variations may be effected in the speed with which one of the shafts is driven from the other.

Each transmitting-shaft 1 and 1ᵃ is formed with an annular groove or channel extended around it, as indicated at 22 in Figs. 1, 4, 5, and 6, and across the under side of said groove or channel 22 is extended a key or filling 23, against which are engaged the lower ends of two semicircular clutch members 24 24 of dimensions adapted to fit snugly in the channel or groove 22 at opposite sides of said filling or key 23 and when in place in the said channel or groove having their outer surfaces flush with the perimeter of the shaft, so as to be adapted in the endwise movement of the shaft to pass freely through the bores of the gear-wheels thereon.

Between the upper ends of the clutch members 24 24 and at the top of the shaft as the parts are shown in the drawings is a space or opening 25, in which is adapted to be engaged the wedge-shaped end portion 26 of a key 27, movable endwise in a groove produced in the shaft and extended lengthwise of the same and having its end connected, as shown in Fig. 2, with a collar 28, mounted for movement endwise of the projecting portion 7 of the shaft at the end of the frame 3 and having connection with the forks of a lever 29, pivoted on a lug 30 on the collar 9 at the reduced end of the shaft. By this construction it will be seen that when the lever 29 is manipulated and swung pivotally to impart endwise movement to the key 27 the wedge-shaped end 26 of said key will by engagement in the space 25 between the ends of the clutch members 24 24 serve to force said members apart in such a way as to engage them forcibly in the bore of that one of the gear-wheels on that transmitting-shaft within which the clutch members stand at that time, so as to lock such gear-wheel securely upon the shaft and compel the shaft and gear-wheel to turn in unison.

The width of the groove or channel 22 in the shaft is less than the widths of the gear-wheels thereon measured across the faces thereof, and since the shaft is movable endwise upon operation of the corresponding handle 15 it will be seen that said shaft may be moved in such a way by means of said handle as to bring the clutch members 24 24 directly inside of the bore of either one of the three gear-wheels upon the shaft, and since the openings 17 in disk 14 are correspondingly located the pin or dog 16 may be operated to hold the clutch members within the bore of the desired gear-wheel while the lever 29 is moved to lock that gear-wheel to the shaft.

In Fig. 1 we have shown the clutch members located in the bore of the central gear-wheel 19$^a$ upon shaft 1$^a$, and when the lever 29 is moved to lock said gear-wheel upon shaft 1$^a$ it will be evident that said shaft will be driven through the medium of the said gear-wheel 19$^a$ from the corresponding gear-wheel 21$^a$ on the intermediate shaft 20. In the same figure we have shown in dotted lines at c the clutch members of shaft 1 as located within the gear-wheel 18 upon shaft 1, and when the lever 29 for that shaft is actuated to lock said gear-wheel 18 to the shaft it will be evident that the movement of the said shaft 1 will be communicated through said gear-wheel 18 and the gear-wheel 21 on shaft 20 to drive said shaft 20, whereby all of the other gear-wheels on shafts 1 and 1$^a$ will be turned by reason of being in mesh with the three gear-wheels on the shaft 20. In this way the shaft 1$^a$ will be driven at a certain speed relatively to the shaft 1, and when it is desired to vary the speed of shaft 1$^a$ it is only necessary to throw one or both of the levers 29 in such a way as to release one or both of the clutch mechanisms of the transmitting-shafts and then to slide one or both of the shafts endwise to secure the required location of the clutch mechanisms with reference to the gears on said shafts, after which the shafts are locked in place by means of the spring-pressed dogs and the lever or levers 29 are actuated to throw the clutch members 24 into engagement with the desired gear-wheel. It will be seen that in the construction shown in the drawings the clutch mechanism for each of the shafts 1 and 1$^a$ is capable of three adjustments independently of the adjustment of the clutch mechanism of the other shaft, and in this way it will be evident that nine variations in speed of the shaft 1$^a$ relative to the shaft 1 may be secured and at the same time the latter shaft 1 will be driven at a constant speed by means of its band or other driving means. It will also be evident that the device is not limited to the employment of but three gear-wheels in the several series on shafts 1, 1$^a$, and 20, but, on the contrary, there may be as many gear-wheels as may be desired on each of these shafts, the number of speed variations afforded being as the square of the number of gear-wheels in each series.

From the above description of our improvements it will be seen that the improved transmitting device is of an extremely simple and inexpensive nature and is at the same time of a very light, strong, and compact structure, so as to adapt it for use in various locations where a considerable number of speed variations are desired, and it will also be obvious from the above description that the device is capable of some modification without material departure from the principles and spirit of the invention, and for this reason we do not desire to be understood as limiting ourselves to the precise form and arrangement of the several parts as herein set forth.

Having thus described our invention, we claim—

1. A transmitting device comprising two transmitting-shafts, a plurality of gear-wheels adapted to turn independently upon each of the respective transmitting-shafts, clutch mechanism for holding said gear-wheels to turn with their respective transmitting-shafts and an intermediate shaft having a plurality of gear-wheels each of which meshes with a gear-wheel on each of the respective transmitting-shafts.

2. A transmitting device comprising two transmitting-shafts, a series of gear-wheels adapted to turn independently upon each of the respective transmitting-shafts, means for holding either gear-wheel in said series to turn with its respective transmitting-shaft and an intermediate series of gear-wheels mounted to turn in unison and arranged to mesh with the gear-wheels of each series on the respective transmitting-shafts.

3. A transmitting device comprising two transmitting-shafts, a series of gear-wheels loosely held on each transmitting-shaft, an intermediate series of gear-wheels mounted to turn in unison and arranged to mesh with the gear-wheels of each series on the respective transmitting-shafts and a clutch mechanism for locking upon each transmitting-shaft one of the gear-wheels of the series thereon.

4. A transmitting device comprising two shafts, a series of gear-wheels on each of the shafts, the gear-wheels on one shaft meshing with those upon the other shaft and the gear-wheels on one shaft being fixed to turn in unison while the gear-wheels on the other shaft are adapted for independent turning movement, another series of independently-turning gear-wheels meshing with the fixed gear-wheels and means for holding either of the first-named series of independently-turning gear-wheels to turn in unison with its shaft.

5. A transmitting device comprising two transmitting-shafts, a plurality of wheels loosely held upon each transmitting-shaft, means to drive all of the wheels on one transmitting-shaft from either wheel on the other transmitting-shaft and means for holding either of the wheels to turn with its respective transmitting-shaft.

6. In a transmitting device, the combination of a shaft mounted for turning and also for endwise movement and provided with a recess in its perimeter, a clutch device located in the recess in the shaft, mechanism for actuating the clutch device and a plurality of gear-wheels held for independent turning movement on said shaft and provided with driving devices, said clutch device being adapted in the endwise movement of the shaft, to be located alternately in the bores of the respective gear-wheels to permit either one of the gear-wheels to be locked to turn with said shaft.

7. In a transmitting device, the combination of a shaft mounted for turning and also for endwise movement and provided with an annular groove in its perimeter, clutch members in said groove with their outer surfaces flush with the surface of the shaft, a key movable in the direction of the length of the shaft and having a wedge-shaped end portion engaged between the clutch members, means for moving the key and a plurality of gear-wheels held for independent turning movement on the shaft, said clutch members being adapted, in the endwise movement of the shaft, to be located alternately in the bores of the respective gear-wheels to permit either one of the gear-wheels to be locked to turn with the shaft.

8. In a transmitting device, the combination of a shaft mounted for turning and also for endwise movement, a plurality of gear-wheels held for independent turning movement on the shaft, a clutch device carried by the shaft and means for actuating the clutch device, said device being adapted, in the endwise movement of the shaft, to be located in position for engagement with either of the respective gear-wheels to permit of being operated to lock either of the gear-wheels to said shaft.

9. In a transmitting device, the combination of a shaft mounted for turning and also for endwise movement, a plurality of gear-wheels held for independent turning movement on the shaft, a clutch device carried by the shaft and adapted, in the endwise movement thereof to be located in position for engagement with either of the respective gear-wheels, means to actuate the clutch device to permit it to be operated to lock either of the gear-wheels to said shaft and a rack-and-pinion mechanism for moving the shaft endwise.

10. A transmitting device comprising a transmitting-shaft, a series of gear-wheels loosely held thereon, means for holding either gear-wheel in said series to turn with the transmitting-shaft, another series of gear-wheels meshing with the gear-wheels on said transmitting-shaft and arranged to turn in unison and a third series of gear-wheels meshing with the gear-wheels which turn in unison.

11. A transmitting device comprising two series of independently-turning gear-wheels having means to hold them to their respective shafts and an intermediate series of gear-wheels arranged to turn in unison, each gear-wheel of said intermediate series being arranged in mesh with one gear-wheel in each of the first-named series of independently-turning gear-wheels.

12. A transmitting device comprising two series of independently-turning gear-wheels, an intermediate series of gear-wheels arranged to turn in unison, each gear-wheel of the intermediate series being in mesh with one gear-wheel in each of the first-named series of independently-turning gear-wheels, a transmitting-shaft whereon one of the series of independently-turning gear-wheels is held and means, movable in the direction of the length of the transmitting-shaft and adapted to lock to said shaft either one of the gear-wheels held thereon.

13. In a transmitting device, the combination of a shaft, three gear-wheels thereon arranged for independent rotation, means for driving each gear-wheel independently of the other gear-wheels, a clutch device movable in the direction of the length of the shaft for location in position for engagement with either gear-wheel thereon, means for moving said clutch device to locate it in position for engagement with either gear-wheel and a lever mechanism connected with each clutch device and independent of said moving means for operating the clutch device to lock either gear-wheel to said shaft.

14. A transmitting device comprising two shafts, a series of gear-wheels on each of the shafts, the gear-wheels on one shaft meshing with those upon the other shaft and the gear-wheels on one shaft being fixed to turn in unison while the gear-wheels on the other shaft are adapted for independent turning movement, means for holding either of the independently-turning gear-wheels to turn in unison with its shaft and a series of gear-wheels each of which is adapted to be independently driven and is engaged with one of the fixed gear-wheels, said last-named series of gear-wheels being adapted to drive the fixed gear-wheels at different speeds.

15. In a transmitting device, the combination of two elements, one of which is a shaft and the other of which is a series of gear-wheels, one element being movable with relation to the other element in the direction of the length of the shaft, a single frictional means held on the shaft and insertible, in the movement of the elements, in the bore of either one of the gear-wheels and adapted, when operated, to lock a gear-wheel to the shaft and mechanism for actuating the frictional locking means independently of the movement of one element relatively to the other.

16. In a transmitting device, the combination of two transmitting-shafts, a series of wheels loosely held on each transmitting-shaft, means to hold either wheel in said series to turn with its respective transmitting-shaft and means, independent of each transmitting-shaft, for driving either wheel on one transmitting-shaft from either wheel on the other transmitting-shaft.

Signed at Cincinnati, Ohio, this 16th day of January, 1903.

WILLIAM E. GANG.
GEO. W. HART.

Witnesses:
JAMES F. LUDDAN,
H. AUGEBRANDT, Jr.,
JOHN ELIAS JONES.